(12) United States Patent
Pan

(10) Patent No.: US 7,483,200 B1
(45) Date of Patent: Jan. 27, 2009

(54) MULTIPLE STOP MICRO-MIRROR ARRAY DISPLAY

(75) Inventor: Shaoher X. Pan, San Jose, CA (US)

(73) Assignee: Spatial Photonics, Inc., Sunnyvale, CA (US)

( * ) Notice: Subject to any disclaimer, the term of this patent is extended or adjusted under 35 U.S.C. 154(b) by 0 days.

(21) Appl. No.: 12/014,026

(22) Filed: Jan. 14, 2008

(51) Int. Cl.
*G02B 26/00* (2006.01)

(52) U.S. Cl. .................. 359/291; 359/224; 359/290; 359/292; 359/295; 359/298; 359/315; 345/85; 345/108; 348/770; 348/771

(58) Field of Classification Search ............ 359/223, 359/224, 290–292, 295, 298, 315; 345/85, 345/108; 348/770, 771
See application file for complete search history.

(56) References Cited

U.S. PATENT DOCUMENTS

| | | | | |
|---|---|---|---|---|
| 5,142,405 A | * | 8/1992 | Hornbeck | 359/226 |
| 6,356,378 B1 | * | 3/2002 | Huibers | 359/291 |
| 6,870,659 B2 | | 3/2005 | Aubuchon | |
| 6,970,280 B2 | * | 11/2005 | Patel et al. | 359/290 |
| 6,992,810 B2 | * | 1/2006 | Pan et al. | 359/290 |
| 7,167,298 B2 | | 1/2007 | Pan | |
| 7,307,777 B2 | * | 12/2007 | Pan | 359/295 |
| 7,382,513 B2 | * | 6/2008 | Yang | 359/290 |
| 7,388,707 B2 | * | 6/2008 | Pan | 359/291 |
| 7,388,708 B2 | * | 6/2008 | Pan | 359/291 |
| 7,391,554 B2 | * | 6/2008 | Pan | 359/291 |
| 7,423,798 B2 | * | 9/2008 | Pan | 359/291 |
| 7,428,092 B2 | * | 9/2008 | Lee et al. | 359/290 |

* cited by examiner

*Primary Examiner*—Evelyn A. Lester
(74) *Attorney, Agent, or Firm*—Fish & Richardson P.C.

(57) ABSTRACT

A micro mirror device is described. The device has a tiltable mirror plate with a reflective surface configured to reflect incident light to form a reflected light beam. A controller is configured to cause the mirror plate to tilt from an un-tilted position to an "off" position, a first "on" position, or a second "on" position. An opaque aperture structure is configured to block substantially all of a reflected light beam from reaching a display surface when the mirror plate is tilted to the "off" position, allow a first portion of a reflected light beam to pass through when the mirror plate is tilted to the first "on" position and allow a second portion of a reflected light beam to pass through when the mirror plate is tilted to the second "on" position. The tilting positions determine a brightness of display pixels.

21 Claims, 13 Drawing Sheets

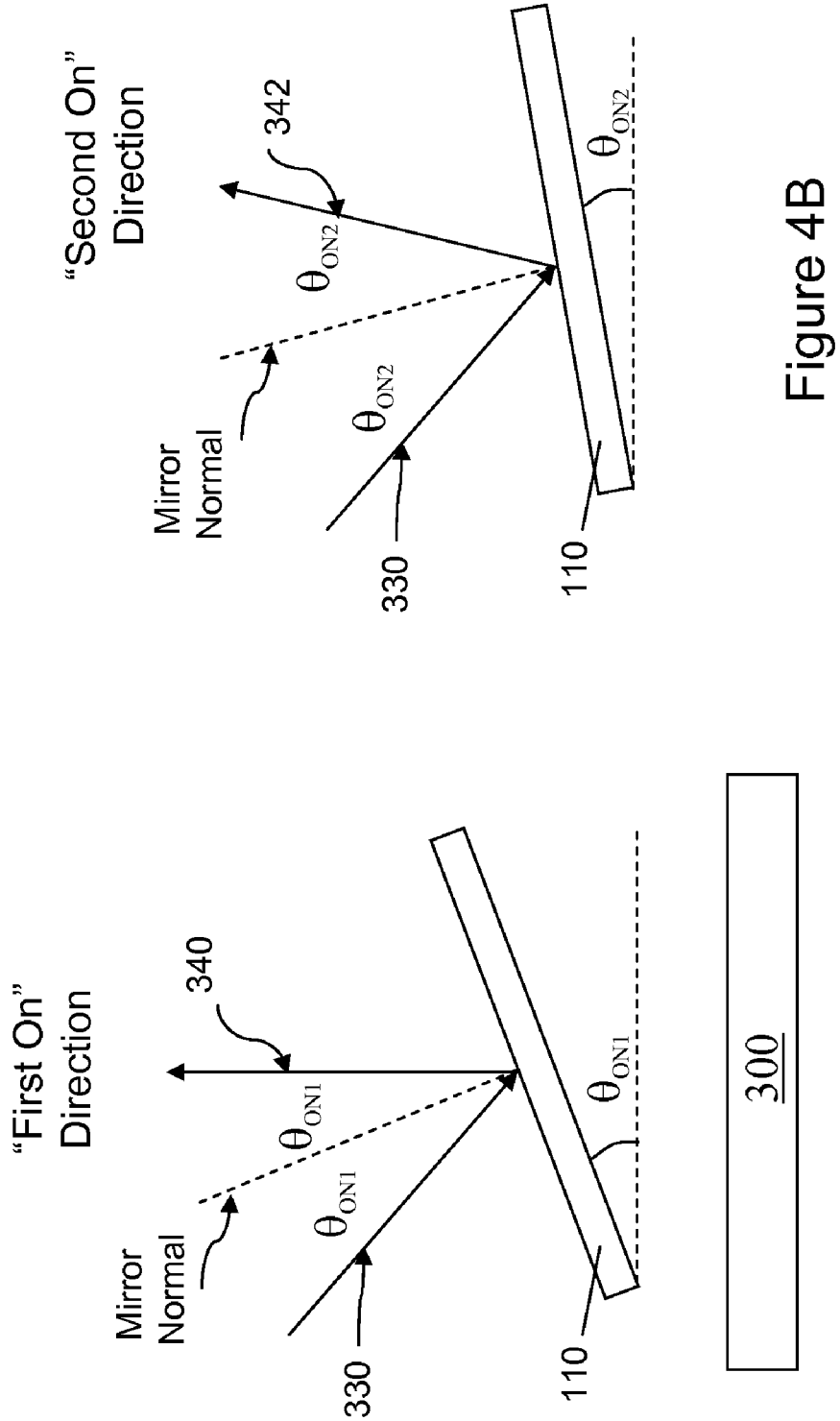

MULTIPLE STOP MICRO-MIRROR ARRAY DISPLAY

BACKGROUND

The present disclosure relates to a micro-mirror-based display system capable of displaying grayscale images.

A spatial light modulator (SLM) can be built with an array of tiltable mirror plates having reflective surfaces. Each mirror plate can be tilted by electrostatic forces to an "on" position and an "off" position. The electrostatic forces can be generated by electric potential differences between the mirror plate and one or more electrodes underneath the mirror plate. In the "on" position, the micro mirror plate can reflect incident light to form an image pixel in a display image. In the "off" position, the micro mirror plate directs incident light away from the display image. The micro mirror plate in the "on" position produces one brightness level in the pixel, and in the "off" position produces a dark state for the pixel. To increase the quality of display images, it is desirable to provide multiple brightness levels in the image pixels.

SUMMARY

In one general aspect, the present invention relates to a micro mirror device that includes a hinge supported by a substrate; a mirror plate tiltable around the hinge and having a reflective surface that can reflect incident light to form a reflected light beam, wherein the hinge can produce an elastic restoring force on the mirror plate when the mirror plate is tilted away from an un-tilted position; a controller that can produce an electrostatic force to overcome the elastic restoring force to tilt the mirror plate from an un-tilted position to an "off" position, a first "on" position, or a second "on" position; an opaque aperture structure that can block substantially all of a reflected light beam from reaching the display surface when the mirror plate is tilted to the "off" position, wherein the opaque aperture structure has an opening that can allow a first portion of a reflected light beam to pass through when the mirror plate is tilted to the first "on" position and to allow a second portion of a reflected light beam to pass through when the mirror plate is tilted to the second "on" position, and the first portion is a greater portion than the second portion; and an optical projection system that can direct the first portion of the reflected light beam to produce at a first level of brightness at a pixel on the display surface and to direct the second portion of the reflected light beam to produce a second level of brightness at the pixel on the display surface, wherein the pixel forms a portion of a display image on the display surface and the first level of brightness is greater than the second level of brightness.

In another general aspect, the present invention relates to a method for producing multiple levels of brightness at a pixel of a display image on a display surface. The method includes tilting a mirror plate supported by a substrate from an un-tilted position to an "off" position, a first "on" position, or a second "on" position, wherein the step of tilting comprises overcoming an elastic restoring force produced by a hinge on the mirror plate; reflecting incident light off of a reflective surface of the mirror plate to form a reflected light beam; passing a first portion of the reflected light beam through an opening of an opaque aperture structure when the mirror plate is tilted to the first "on" position; directing the first portion of the reflected light beam to produce at a first level of brightness at a pixel in the display image; passing a second portion of the reflected light beam through an opening of the aperture structure when the mirror plate is tilted to the second "on" position; directing the second portion of the reflected light beam to produce a second level of brightness at the pixel in the display image, wherein the first portion of the reflective light beam is greater than the second portion of the reflective light beam and wherein the first level of brightness is greater than the second level of brightness; and blocking substantially all of the reflected light beam from reaching the display surface with an opaque portion of the aperture structure when the mirror plate is tilted to the "off" position.

Implementations of the system may include one or more of the following features. The controller can produce an electrostatic force to tilt the mirror plate from the un-tilted position to a third "on" position; and the opening in the aperture structure can allow a third portion of a reflected light beam to pass through to produce at a third level of brightness at the pixel on the display surface when the mirror plate is tilted to the third "on" position, wherein the third level of brightness is lower than the second level of brightness. The electrostatic force can counter the elastic restoring force to hold the mirror plate at the first "on" position, the second "on" position, or the "off" position. The hinge can elastically restore the mirror plate from the first "on" position, the second "on" position, or the "off" position to the un-tilted position after the electrostatic force is reduced or removed. The micro mirror device can further include an electrode on the substrate, wherein the controller can apply a voltage to the electrode to produce the electrostatic force. At least one of the first "on" position, the second "on" position, or the "off" position can have a tilt angle 1 degree or greater relative to the un-tilted position. The first "on" position, the second "on" position, and the "off" position can have tilt angles 10 degrees or smaller relative to the un-tilted position. The first "on" position, the second "on" position, and the "off" position can have tilt angles 6 degrees or smaller relative to the un-tilted position. The mirror plate in the un-tilted position can be substantially parallel to an upper surface of the substrate. The un-tilted position can be different from the first "on" position, the second "on" position, or the "off" position. The un-tilted position can be the same as one of the first "on" position, the second "on" position, or the "off" position. The incident light can have a substantially constant intensity.

Implementations may include one or more of the following advantages. The present specification discloses a micro-mirror based display device that is capable of producing grayscale display images, thus providing higher image quality than micro-mirror display devices that only produce a single brightness level. A tiltable mirror plate can be tilted to and held at predetermined angles in response to electric signals provided by a controller. No mechanical stop is required on the substrate or on the mirror plate to stop the tilted mirror plate and define the tilt angles of the mirror plate. Eliminating mechanical stops can simplify a micro mirror device, when compared to some micro mirror devices with mechanical stops. The lack of mechanical contact between the mirror plate and a structure, e.g., a mechanical stop, on the substrate, may also remove the problem of stiction that is known to exist between a mirror plate and mechanical stops in some mirror devices. Mirror plates described herein may tilt to a narrower angle than mirror plates in conventional devices. Less mirror plate tilting can cause less strain on the hinge around which the mirror plate rotates. Such devices may be less likely to experience mechanical breakdown. Thus, the useful lifetime of the device may be longer. Moreover, because the mirror plate undergoes a smaller angular deflection, it can operate at higher frequencies. Further, less tilting of the mirror plate allows the disclosed display device to use less power than the some other mirror based devices.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

FIGS. 4A-4C illustrate reflections of incident light by the tilted mirror plate the first when the mirror plate is at a first "on" position, a second "on" position, and an "off" position respectively.

DETAILED DESCRIPTION

Figure 1:
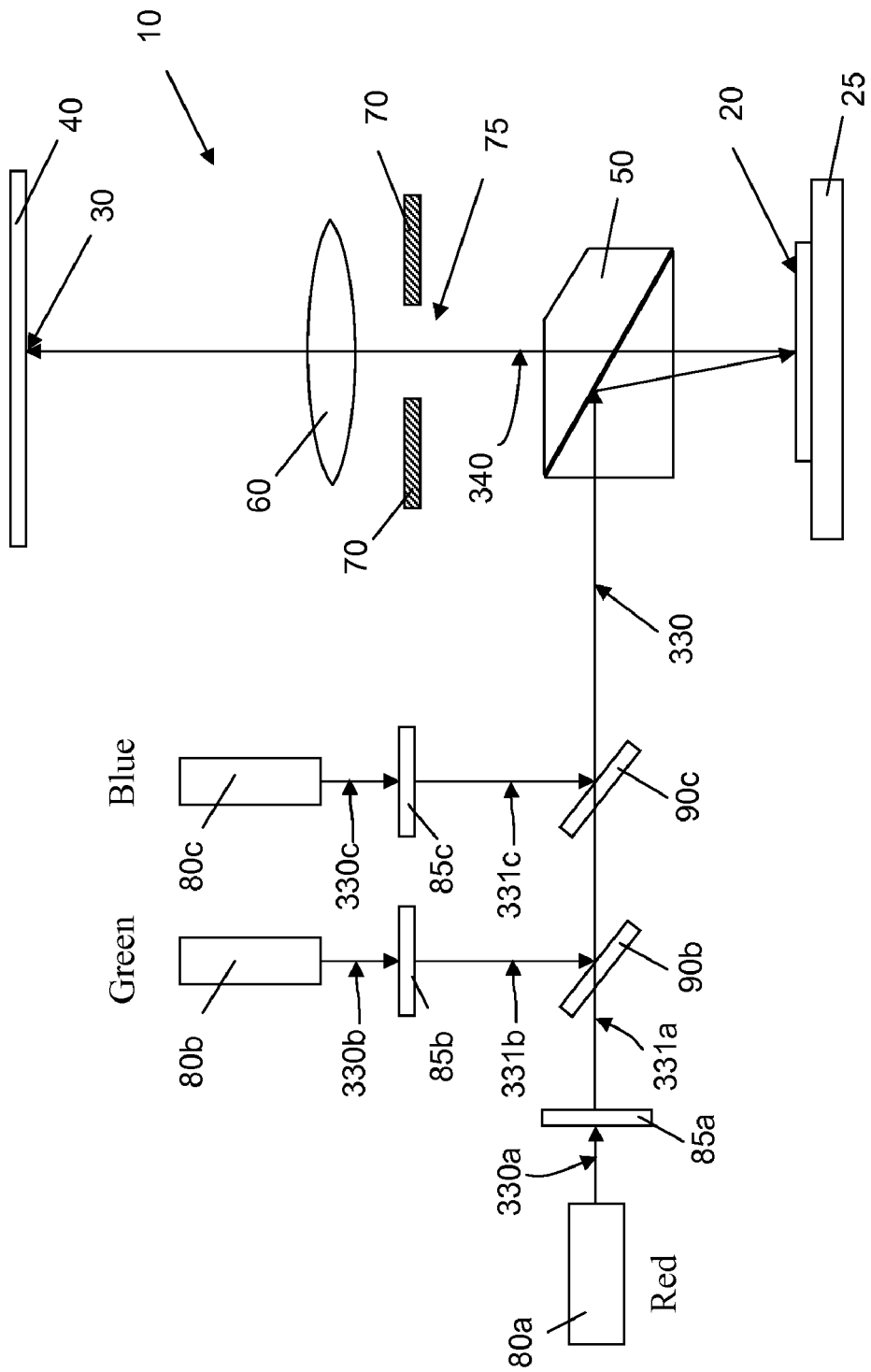
FIG. 1 illustrates a schematic diagram of a micro-mirror based display system capable of displaying grayscale images.

Referring to FIG. 1, one embodiment of a display system 10 includes a micro mirror array 20 on a support member 25, an opaque aperture structure 70 having an opening 75, and a projection system 60. One or more light sources that direct light to the micro mirror array 20 includes red, green, and blue light sources 80a, 80b and 80c, which can respectively are able to emit red, green, and blue colored light beams 330a, 330b, and 330c. The light sources 80a, 80b and 80c can be red, green, and blue lasers emitting laser beams. The light sources 80a, 80b and 80c can alternatively produce collimated non-coherent light beams. The red, green, and blue colored light 330a, 330b, and 330c optionally passes through diffusers 85a, 85b, and 85c to form colored light 331a, 331b, and 331c. The diffusers 85a, 85b, and 85c resize (e.g., expand) and shape the cross-sections of the light beams 330a, 330b, and 330c to be compatible with the micro mirror array 20. For example, the colored light 331a, 331b, and 331c can be shaped to be rectangular, which may be more compatible with the shape of the micro mirror array 20. The colored light 331b, and 331c is then reflected by beam splitters 90b, and 90c (which also function as beam combiners), and merged into a color incident light 330. The colored light 331a passes through the beam splitter 90b, and then travels along the same optical path as the colored light 331b, and 331c. The color incident light 330 is reflected by a total internal reflection (TIR) prism 50 to illuminate micro mirrors in the micro mirror array 20. As described in more detail below, at least a portion of a reflected light beam 340 from a micro mirror in the micro mirror array 20 passes through the TIR prism 50 and the opening 75 of the aperture structure 70. The reflected light beam 340 is then projected by a projection system 60 to form a display pixel 30 on a display surface 40.

Figure 2A:
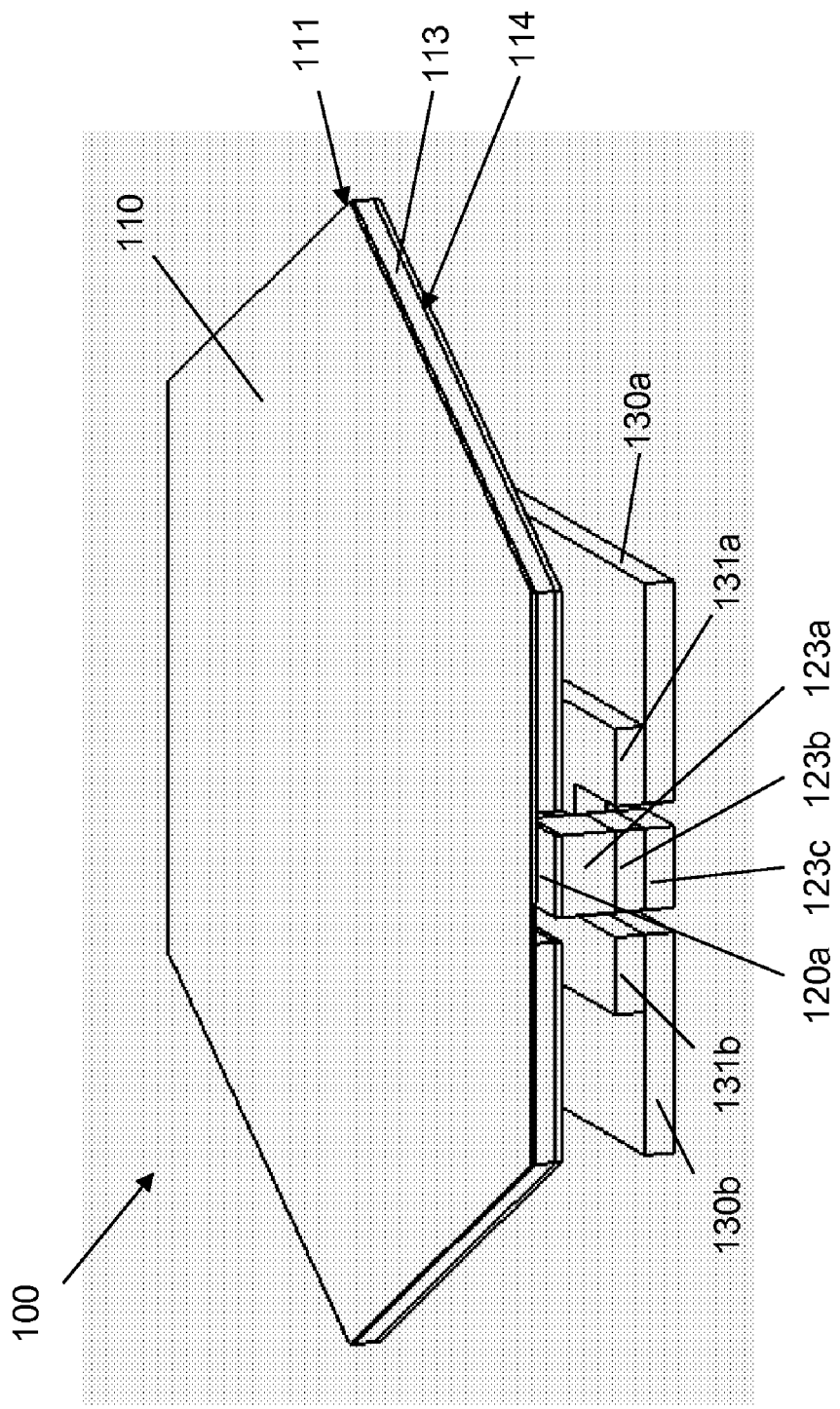
FIGS. 2A and 2B are a perspective view and an expanded view of a micro mirror.
Figure 2B:
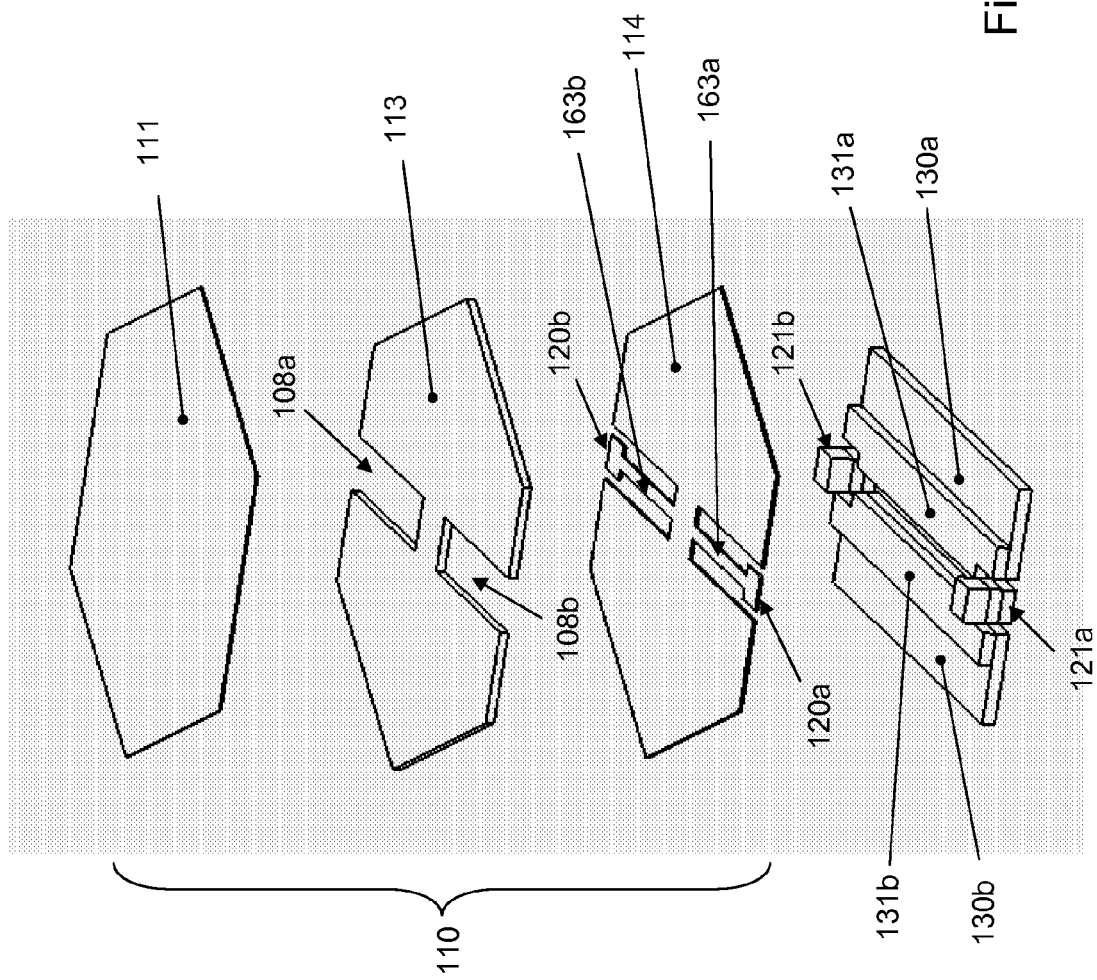
Figure 3:
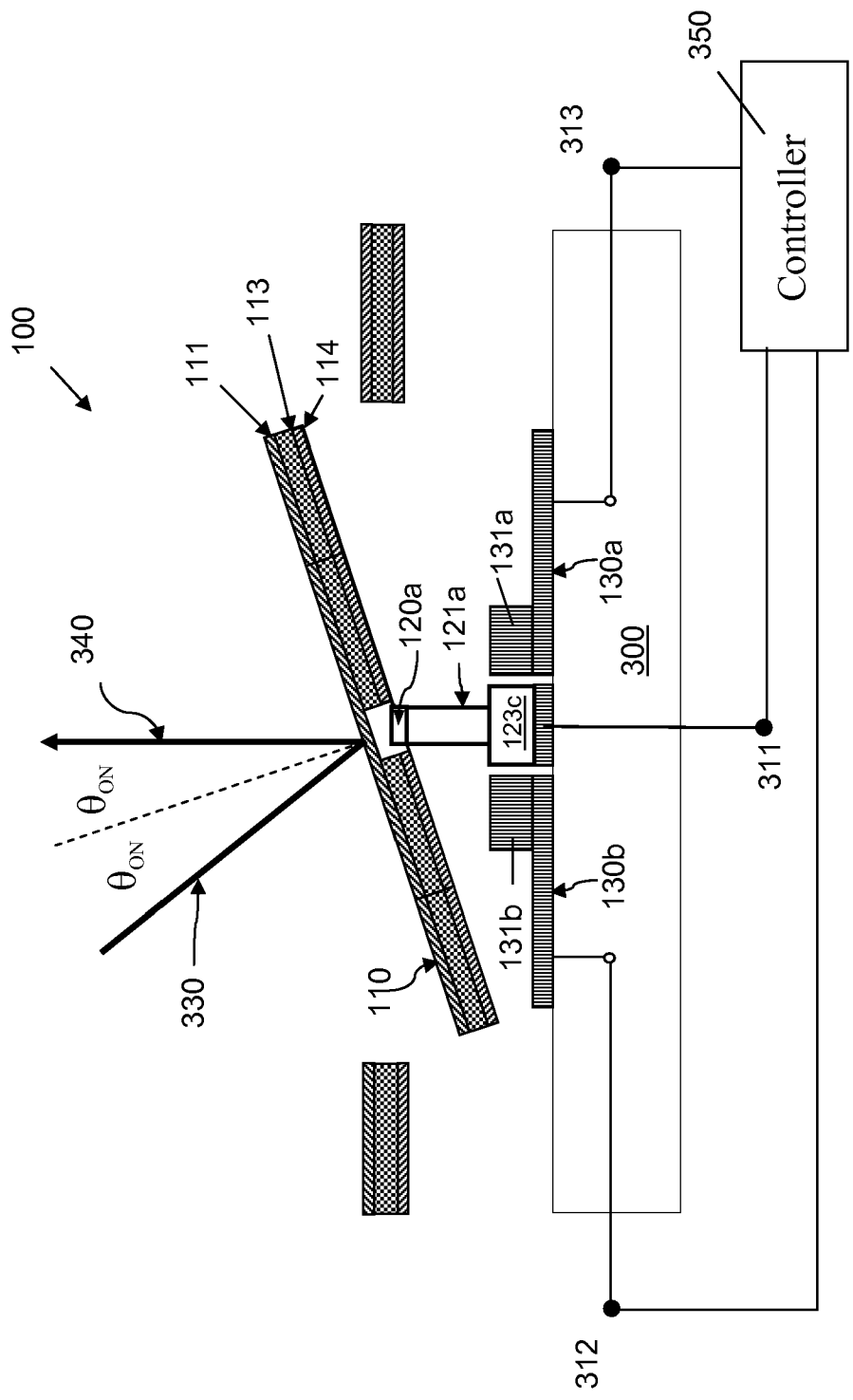
FIG. 3 is a side view of the micro mirror of FIGS. 2A and 2B.

The micro mirror array 20 includes a plurality of micro mirrors arranged in an array. Referring now to FIGS. 2A-3, a micro mirror 100 can include a mirror plate 110 over a substrate 300. The mirror plate 110 can include a reflective layer 111, a spacer layer 113, and a hinge layer 114. In some embodiments, the spacer layer 113 includes a pair of openings 108a and 108b. In some embodiments, the hinge layer 114 includes two hinge components 120a and 120b. The hinge components 120a and 120b are connected with the main portion of the hinge layer 114 by elongated hinges 163a and 163b respectively. The elongated hinges 163a and 163b are separated from the main portion of the hinge layer 114 by gaps on the two sides of the elongated hinges 163a or 163b. The mirror plate 110 is at an un-tilted position with an external force being applied to the mirror plate 110. The un-tilted position can be substantially parallel to the upper surface of the substrate. The mirror plate 110 can be tilted about an axis defined by the two hinge components 120a and 120b. One hinge component 120a (or 120b) is connected to a hinge support post 121a (or 121b) on the substrate 300. The hinge support post 121a can be of unitary construction, or include two or three portions. For example, the hinge support post 121a can include an upper portion 123a, a middle portion 123b, and a lower portion 123c that can be formed in separate deposition steps.

The micro mirror 100 can further include a two-part electrode with lower portion 130a and upper portion 131a on one side of the hinge support posts 121a, 121b, and another two-part electrode with lower portion 130b and upper portion 131b on another side of the hinge support posts 121a, 121b. The two two-part electrodes are on a top surface of the substrate 300 and under the mirror plate 110. The electrode lower portions 130a, 130b can be formed from one conductive layer. The electrode upper portions 131a, 131b can be formed from another conductive layer over the electrode lower portions 130a, 130b. The hinge support posts 121a, 121b are connected to a control line 311, the two-part electrode 130a, 131a is connected to a control line 312, and the two-part electrode 130b, 131b is connected to a control line 313. The electric potentials of the control lines 311, 312, 313 can be separately controlled by external electric signals provided by a controller 350. The potential difference between the mirror plate 110 and the two-part electrodes 130a, 131a or two-part electrodes 130b, 131b can produce an electrostatic torque that can tilt the mirror plate 110.

Figure 4C:
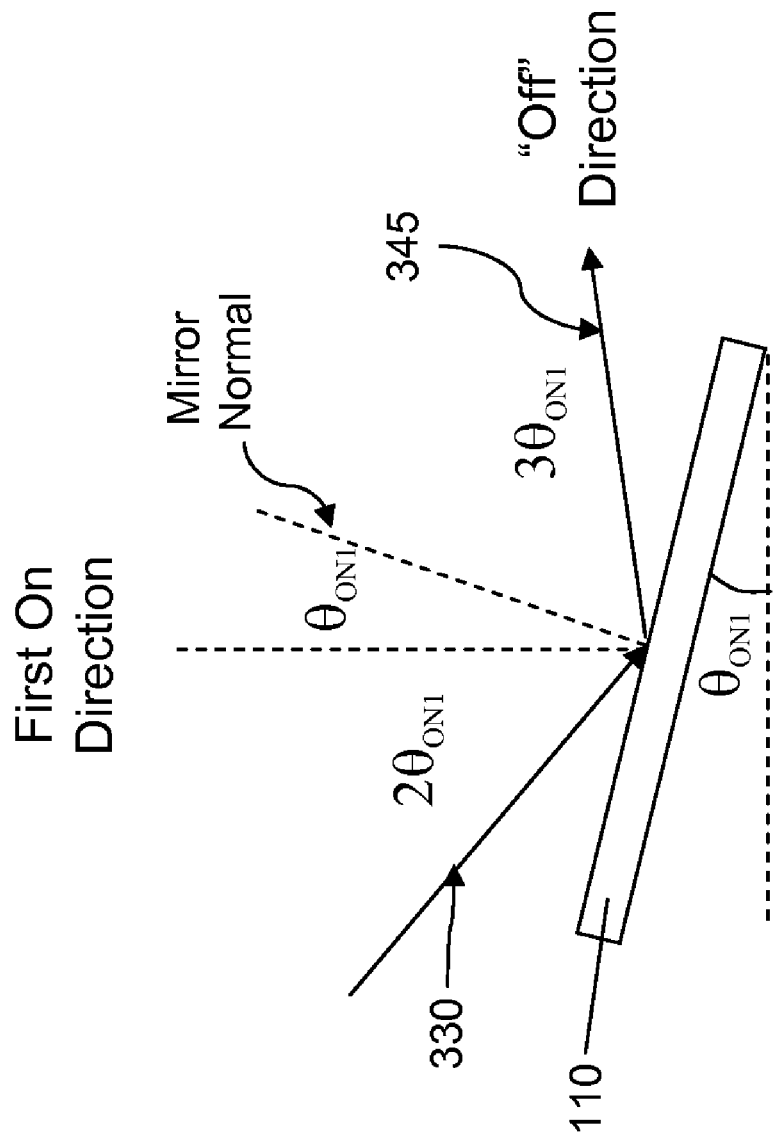

Referring to FIGS. 3 and 4A, the controller 350 can output electrical signals to produce an electrostatic force that overcomes an elastic restoring force produced by the distorted elongated hinges 163a or 163b (see FIG. 2B) to tilt the mirror plate from the un-tilted position to a first "on" position, a second "on" position, or an "off" position. The electrostatic force can counter the elastic restoring force to hold the mirror plate 110 at the first "on" position (FIG. 4A), the second "on" position (FIG. 4B), or the "off" position (FIG. 4C). In some embodiments, the un-tilted position is different from the first "on" position, the second "on" position, and the "off" position. In some embodiments, the un-tilted position is the same as one the first "on" position, the second "on" position, or the "off" positions. The mirror plate 110 can be held respectively at the first "on" position, the second "on" position, or the "off" positions for a predetermined period of time by electrostatic forces that counter the elastic restoring forces produced by the distorted elongated hinges 163a or 163b. The periods of time are determined by the frame rate, the bit depth of an image, and pixel values of an image pixel that the micro mirror 100 is intended to display. For example, a mirror can be held in one of the positions for a frame, or for a fraction of a frame. Because each display pixel can require light reflected from a single mirror for different periods of time depending on the image to be displayed, the mirror may appear to move in an aperiodic manner.

Figure 5A:
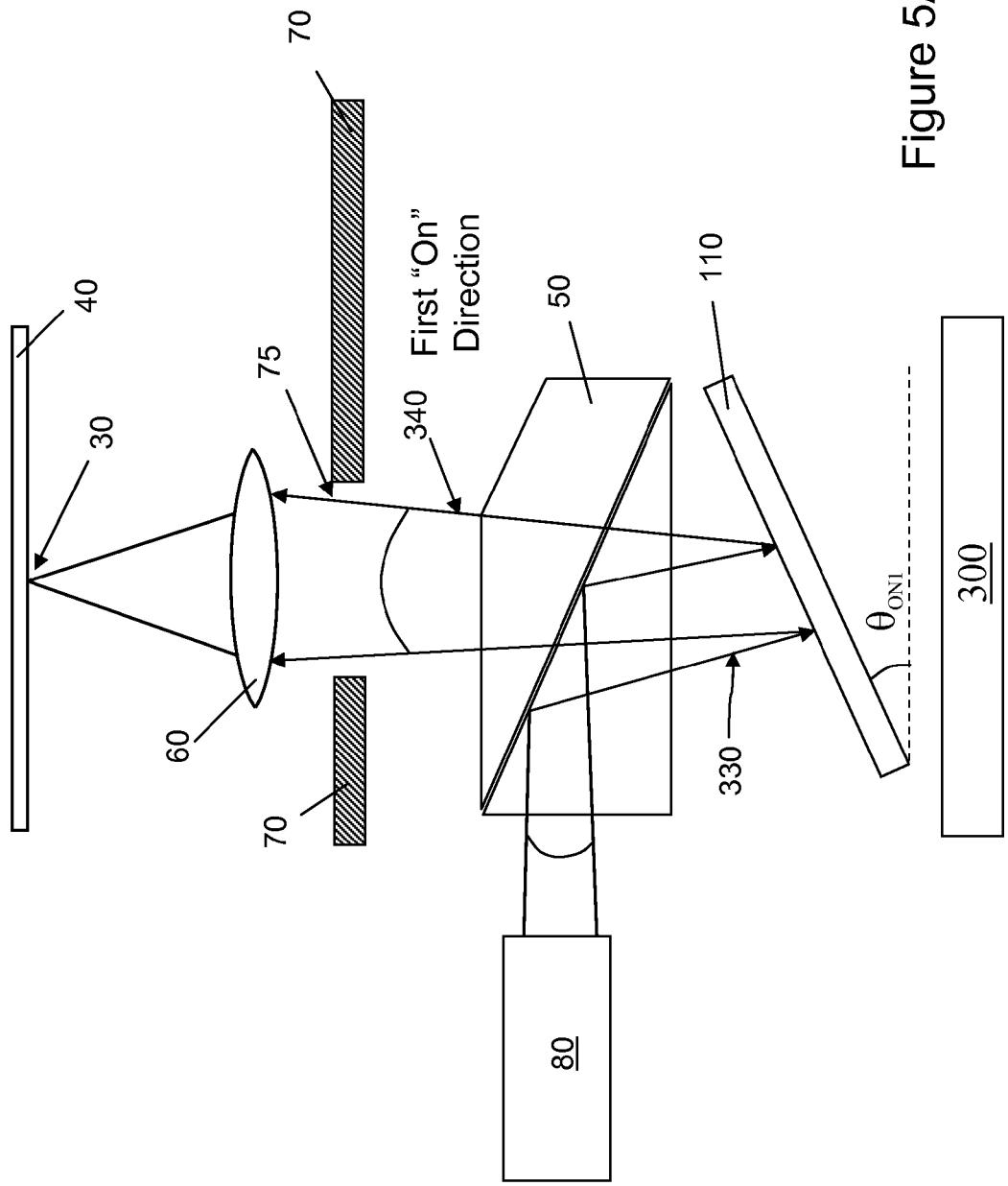
FIGS. 5A-5B illustrates the optical paths of reflected light beams to a display surface when the mirror plate is respectively in the first "on" position and the second "on" position.

The mirror plate 110, as shown in FIGS. 4A and 5A (for clarity reasons, only a single light source is shown without a TIR in FIG. 5A), can tilt from the un-tilted position to a first "on" position that has a tilt angle $\theta_{on1}$ relative to the substrate 300. The mirror plate 110 can reflect an incident light 330 to form reflected light beam 340 traveling in a first "on" direction such that the reflected light beam 340 arrives at a display surface 40 to form an image pixel in a display image. The first "on" direction is typically perpendicular to the substrate 300. Since the incident angle (i.e., the angle between the incident light 330 and the mirror normal direction) and the reflection angle (i.e., the angle between the reflected light beam 340 and the mirror normal direction) are the same, the incident light 330 and the reflected light beam 340 form an angle $2\theta_{on1}$ that is twice as large as the tilt angle $\theta_{on1}$ of the mirror plate 110.

Figure 6:
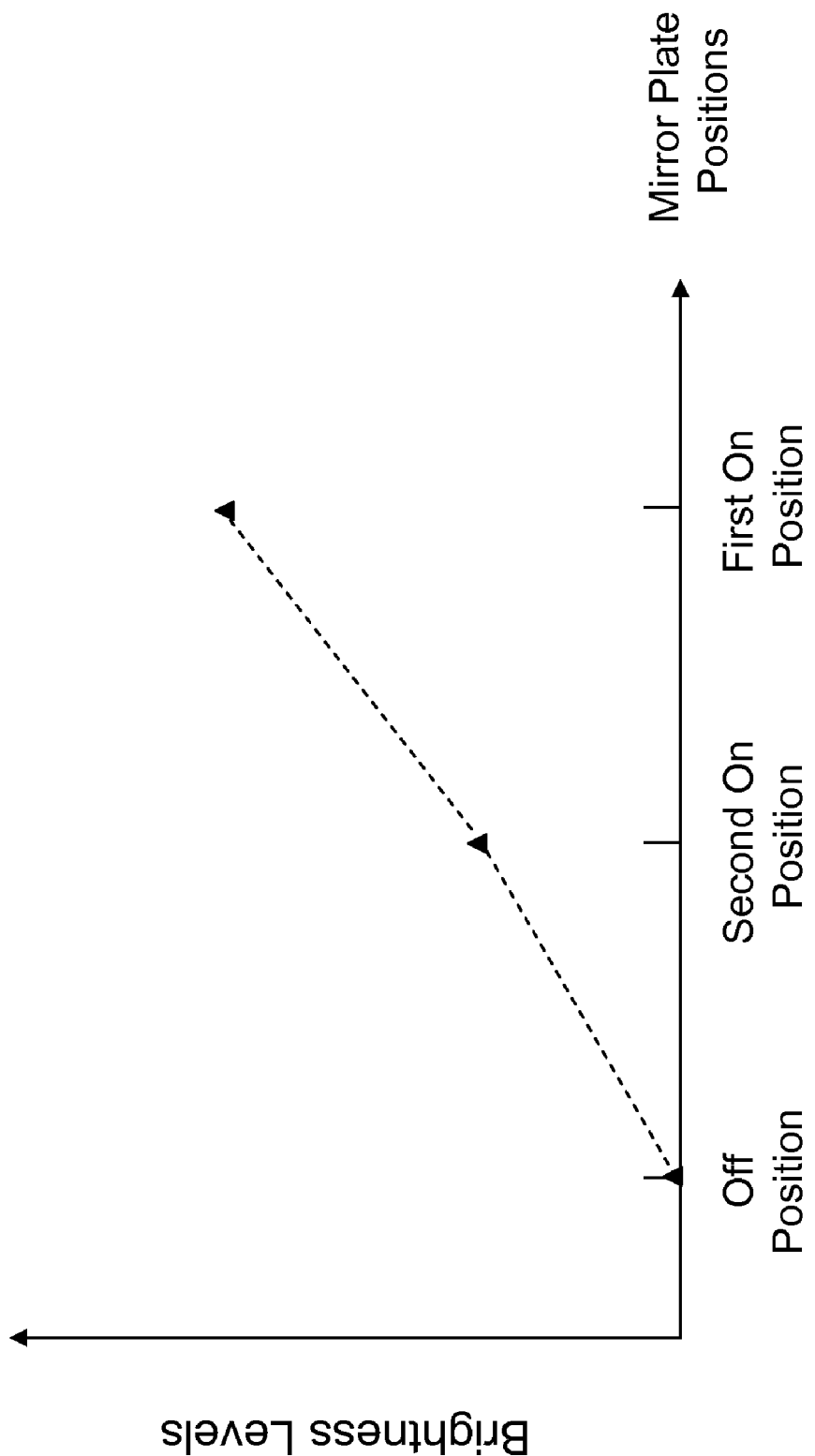
FIG. 6 illustrates the brightness levels at a pixel on the display surface corresponding to the first "on" position, the second "on" position, and the "off" position of the mirror plate.

A light source 80 can emit a coherent and collimated light beam to illuminate the mirror plate 110. The light source 80 can produce a laser beam or a collimated light beam. The intensity of the laser beam is substantially constant during the time frame for displaying an image, a frame of an image or a portion of a frame of an image. The incident light 330 is reflected by the mirror plate 110 to form the reflected light beam 340. The aperture structure 70, the light source 80, and the mirror plate 110 are arranged such that almost all the reflected light beam 340 passes through the opening 75 in the aperture structure 70 when the mirror plate 110 is tilted in the first "on" direction. A projection system 60 can focus the reflected light beam 340 to produce an image pixel 30 on the display surface 40. The mirror plate 110 and the display surface 40 are respectively positioned in the object plane and the image plane of the projection system 60. The image pixel 30 is thus an image of the mirror plate 110. When the mirror plate 110 is tilted in the first "on" direction, the image pixel, as shown in FIG. 6, has a maximum brightness level.

Figure 5B:
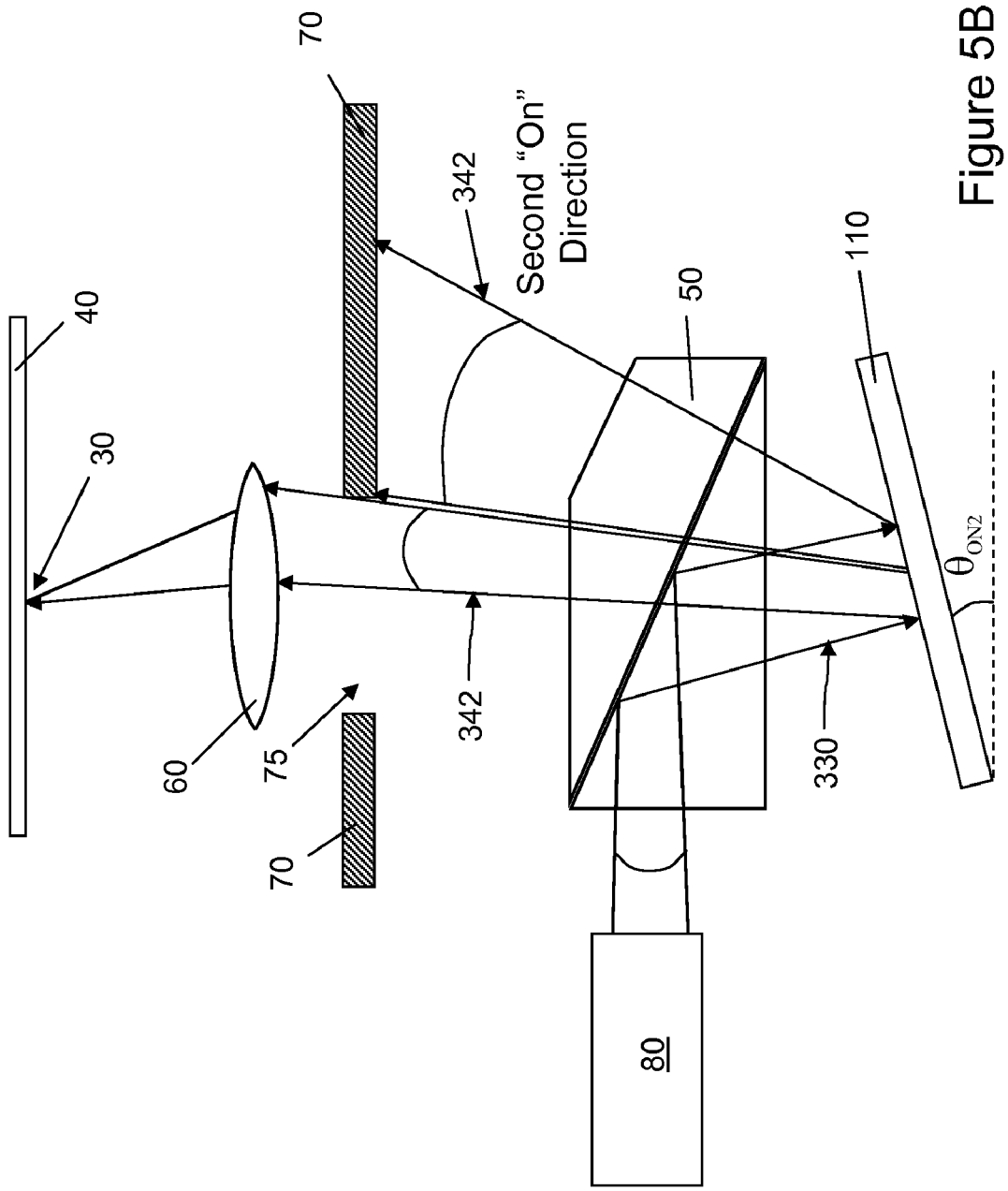

Referring to FIGS. 4B and 5B, the mirror plate 110 can also tilt from the un-tilted position to a second "on" position that has a tilt angle $\theta_{on2}$ relative to the substrate 300. The tilt angle $\theta_{on2}$ of the mirror plate 110 is different from the tilt angle $\theta_{on1}$. The mirror plate 110 can reflect an incident light 330 to form the reflected light beam 342 traveling in a second "on" direction. The second "on" direction can be oblique to the normal direction of the substrate 300. A portion of the reflected light beam 342 can pass through the opening 75 to arrive at a display surface to form an image pixel in a display image, while another portion of the reflected light beam 342 is blocked by the opaque portion of the aperture structure 70. The projection system 60 can focus the reflected light beam 342 passing through the opening 75 to produce an image pixel 30 on the display surface 40. As described above, the display image formed on the display surface 40 is an image of the image array 20 formed the projection system 60. The image pixel 30 is an image of the mirror plate 110 formed on the projection system 60. In the optical system of the projection system 60, the mirror plate 110 can be viewed as a point object and the image pixel 30 a point image. The location of the image pixel 30 is independent of the direction the light rays travel from the mirror point object to the point image. In some embodiments, the projection system 60 is configured to focus a beam of light reflected from a mirror at the same location on the display surface 40 regardless of the angle at which the light is reflected from the mirror surface and onto the projection system 60. Because a portion of the reflected beam 342 is blocked when the mirror plate 110 is tilted to the second "on" position the image pixel 30, as shown in FIG. 6, has a brightness level lower than the maximum brightness level corresponding to the first "on" position of the mirror plate 110.

Figure 5C:
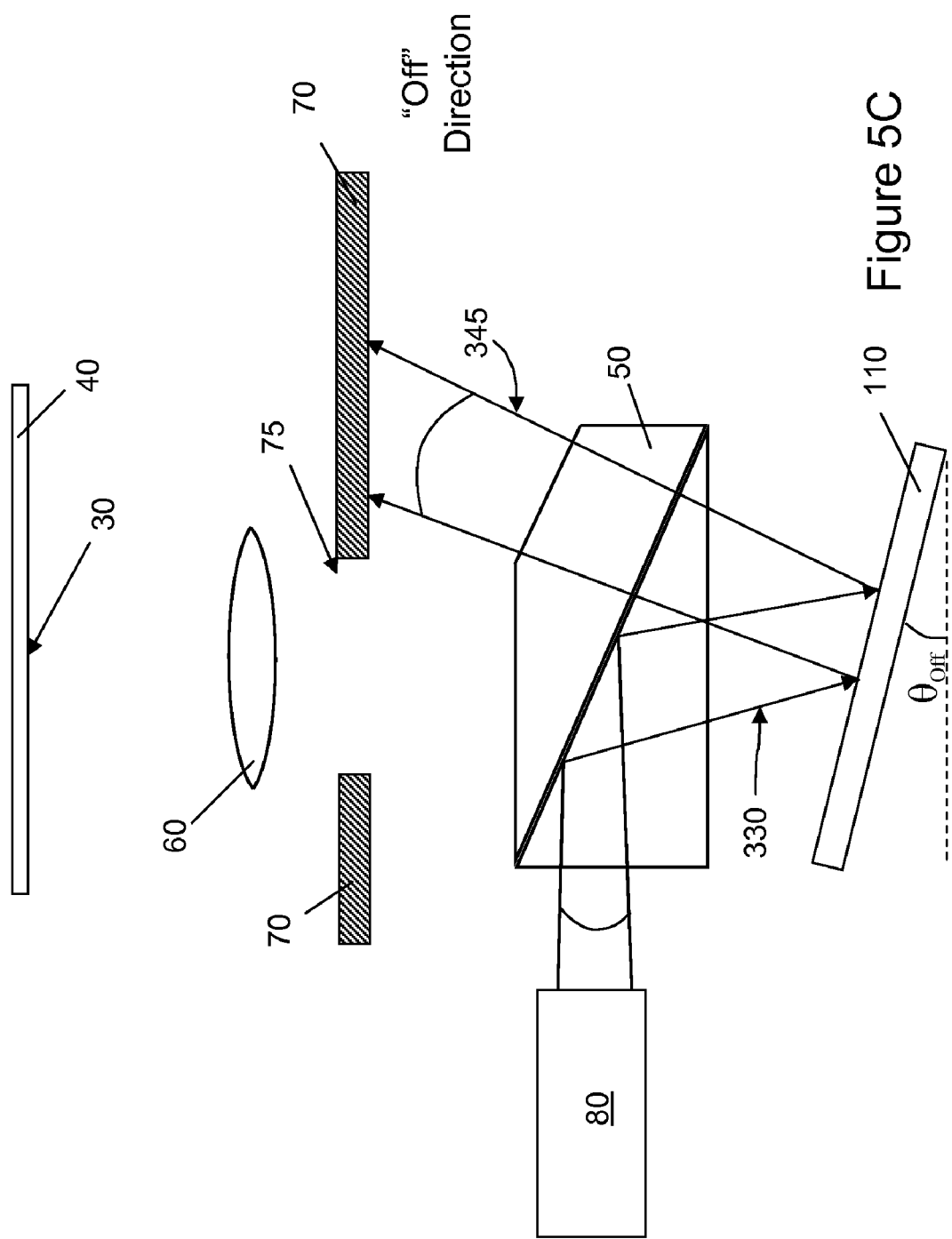
FIG. 5C illustrates the blocking of a reflected light beam by an aperture structure when the mirror plate is in the "off" position.

Referring to FIGS. 4C and 5C, the mirror plate 110 can tilt to an "off" position that is different from the first and the second "on" position. In one implementation, the "off" position can be tilted in an opposite direction relative to the first "on" direction while it is at a same tilt angle $\theta_{on1}$ relative to the substrate 300. It should be noted that the tilt angle for the "off" position can be different from a tilt angle of any of the "on" positions. The mirror plate 110 can reflect the incident light 330 to form reflected light 345 traveling in an "off" direction. The reflected light 345 can be blocked by the opaque portion of the aperture structure 70 and absorbed by a light absorber. Because the incident angle for the incident light 330 is $3\theta_{on1}$, the reflection angle should also be $3\theta_{on1}$. Thus the angle between the reflected lights 340 in the first "on" and the "off" directions is $4\theta_{on1}$, four times as large as the tile angle $\theta_{on1}$ of the mirror plate 110. Because substantially all the reflected beam 345 is blocked by the aperture structure 70 when the mirror plate 110 is tilted to the "off" position, the image pixel 30, as shown in FIG. 6, is dark, which defines the minimum brightness level on the display surface 40.

Figure 5D:
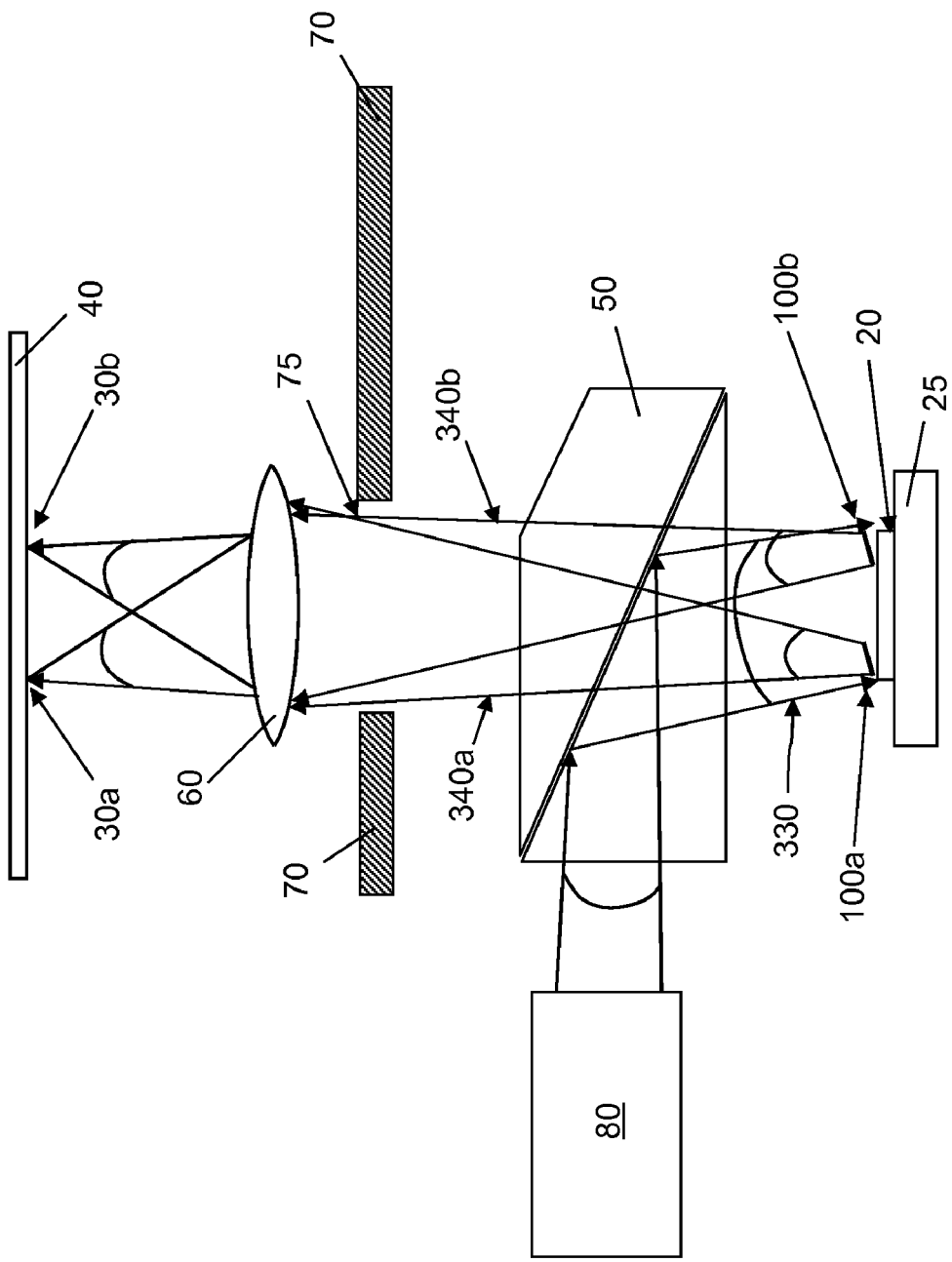
FIG. 5D illustrates the optical paths of reflected light beams from different micro mirrors in a mirror array to a display surface when the corresponding mirror plates are in the first "on" position.

FIG. 5D illustrates the optical paths of reflected light beams 340a, 340b from different micro mirrors 100a, 100b in a mirror array 20 to a display surface 40. The incident beam 330 impinges on the mirror array 20. The mirror plates in the micro mirrors 100a, 100b are both at the first "on" position. A portion of the incident beam 330 is reflected by the micro mirror 100a as reflected beam 340a. Another portion of the incident beam 330 is reflected by the micro mirror 100b as reflected beam 340b. (Not all micro mirrors of the mirror array and their reflected light beams are shown for simplicity). Each of the reflected beams 340a, 340b can almost fill the aperture opening 75 when the mirror plates in the micro mirrors 100a, 100b are on the first "on" position, which produces maximum brightness at their respective display pixels 30a, 30b on the display surface 40. One or more optical lenses and an aperture can be included to limit the width and to define the angular convergence (or spread) of the incident beam 330 to cause the reflected beams 340a, 340b from different mirror plates 100a, 100b to substantially fill the aperture opening 75.

The aperture structure 70 can be positioned at a distance from the micro mirror array 20 that is much greater than the width of the micro mirror array 20 and the width of the aperture opening 75. Small tilt angles in the mirror plate can cause a portion of the reflected beam to be blocked or partially blocked by the aperture structure 70. The aperture opening 75 can have a width two to five times, such as four times, the width of the mirror array 20. The distance between the aperture structure 70 and the mirror array 20 can be five to forty times, such as twenty times, the width of the mirror array 20. In one exemplary system, the distance between the aperture structure 70 and the mirror array 20 is about 100 mm, the width of the mirror array is about 2 mm, each mirror is less than about 10 microns, the aperture opening 75 has a diameter of about 20 mm and the light source is 100 mm from the array. Although different micro mirrors 100a, 100b produce somewhat laterally shifted reflected beams 340a, 340b at the aperture opening 75, the lateral shift is small because the width of the mirror array 20 is much smaller than the distance between the mirror array and the aperture structure 70. As a result, the mirror tilt angles at the first "on" positions, the second "on" positions, and the "off" positions can be substantially the same for the different mirrors in the mirror array 20. The different brightness levels at the image pixel 30 allow the display to have a grayscale image displayed on the display surface 40. In some embodiments, the mirror plate can be tilted to more than two "on" positions as described above. Three, four, five, or more brightness levels can be achieved by tilting the mirror plate to these different tilt positions. For example, the mirror plate 110 can tilt to a third "on" position to direct a portion of a reflected beam through the opening 75 to arrive at the image pixel on the display surface. The third "on" position has a different tilt angle from the first two "on" positions. The portion of the reflected beam 342 through the opening 75 at the third "on" position can be lower than the portion of the reflected light beam 342 created when the mirror plate is tilted at the second "on" position that passes the opening 75. In other words, a larger portion of the reflected light beam 342 is blocked by the aperture 70 when the mirror plate 110 is tilted to the third "on" position. The mirror plate 110 at the third "on" position can thus produce a brightness level lower than the second brightness level, that is, the mirror plate 110 at the third "on" position can produce a third brightness level lower than the two brightness levels produced by the mirror plate tilted at the first and second "on" positions.

The tilt angle $\theta_{on1}$ at the first "on" direction of the mirror plate 110 can be in a range about 1° and about 10°, such as about 2°, about 3°, about 4°, about 5°. In some embodiments, the tilt angle $\theta_{on1}$ can be in a range about 1° and about 6°.

Any stray reflected light that passes through the opening 75 when the mirror plate is at the "off" position can decrease the contrast of the display image. The angular spread of a typical laser beam for the incident light 330 can be controlled below 1°. When the tilt angle $\theta_{on1}$ is selected to be at 1°, the angular difference between the reflected light beams 340 and 345 in the first "on" and the "off" directions is $4\theta_{on1}$, or 4°, which is large enough to prevent almost all the reflected laser beam 345 from entering the opening 75. Larger tilt angle $\theta_{on1}$ can further increase contrast in the display images.

In some conventional micro mirror devices, the tilt movement of the mirror plates is stopped by the mechanical stops. The "on" and "off" positions of a tiltable mirror plate are defined by the mirror plate's orientations when it is in contact with the mechanical stops. In contrast, the micro mirror 100 does not include mechanical stops that can limit the tilt movement of the mirror plate 110. Rather, the "on" and "off" positions of the mirror plate 110 are controlled by a driving voltage applied to the mirror plate 110 and the two-part electrodes 130a, 131a, 130b, and 131b. For this reason, the disclosed mirror plate 110 can be referred as "non-contact" micro mirrors. The conventional mirror systems that utilize mechanical stops or include a mirror plate that contacts the substrate when in a tilted position can be referred as "contact" micro mirrors.

Figures 7A, 7B:
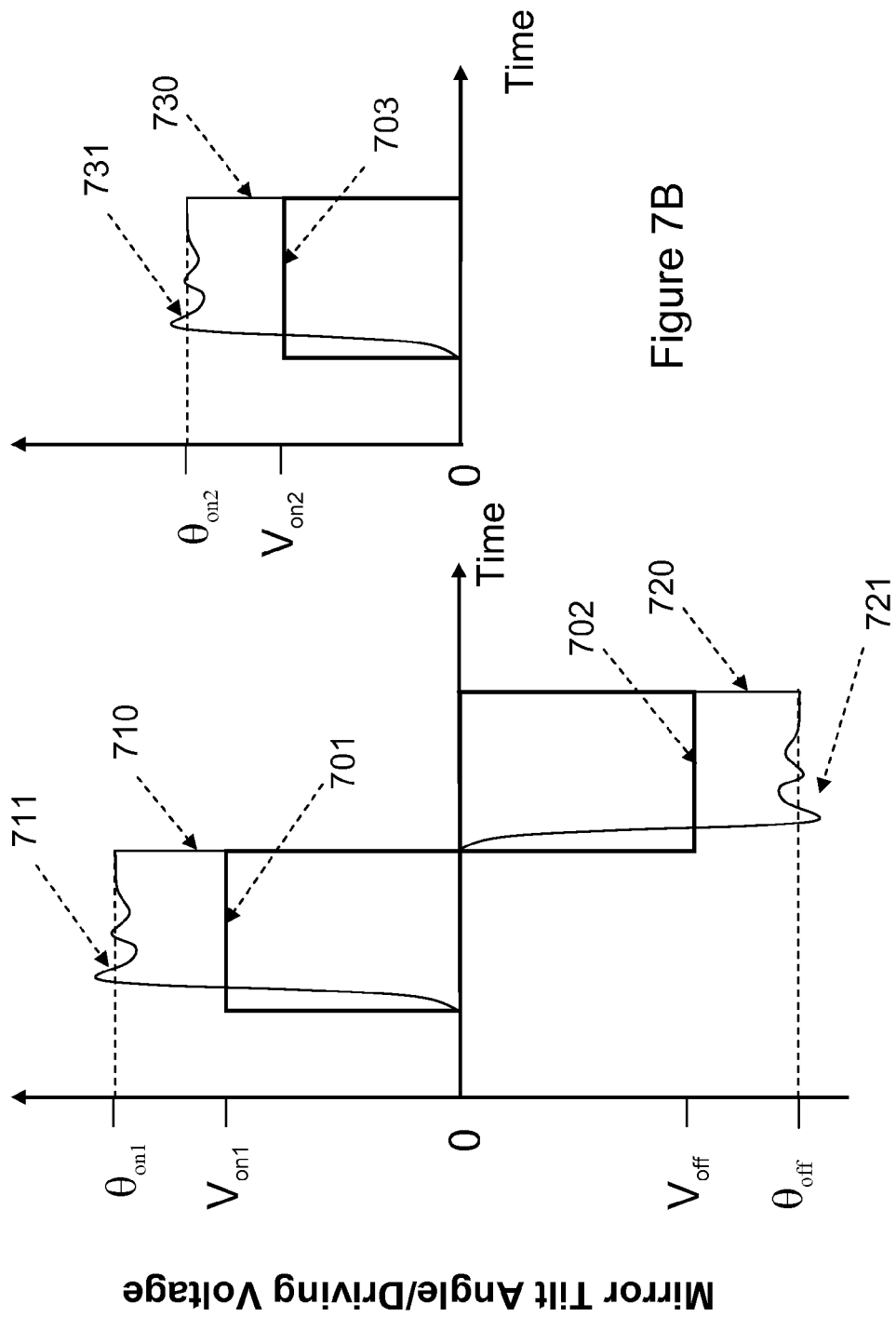
FIGS. 7A and 7B illustrate temporal profiles of the driving voltage pulses and the resulting tilt angles in the mirror plate.

Referring to FIG. 7A, a positive driving voltage pulse 701 and a negative driving voltage pulse 702 are shown along with their respective tilt angle responses 710 and 720 to the first "on" position and the "off" position. Similarly, a smaller positive driving voltage pulse 703 is shown in FIG. 7B along with its corresponding tilt angle responses 730 to the second "on" position. A zero tilt angle can correspond to the horizontal orientation at which the mirror plate 110 is parallel to the surface of the substrate 300. The positive driving voltage pulse 701 or 703 includes a driving voltage $V_{on}$ and is used to control the mirror plate 110 to the first or second "on" positions, as shown in FIGS. 3, 4A, 4B, 5A, and 5B. The positive voltage pulse 701 can create an electrostatic force that tilts the mirror plate 110 to the first or the second "on" positions, which is a counter clockwise direction in the figures, to a tilt angle $\theta_{on1}$ (or $\theta_{on2}$) relative to the upper surface of the substrate 300. The mirror plate 110 does not experience any elastic restoring force at the un-tilted position. As the mirror plate 110 tilts, the mirror plate 110 experiences an elastic restoring force, created by the torsional distortion of the elongated hinges 163a or 163b, which applies a force on the mirror plate 110 in the clockwise direction. Although the electrostatic force increases somewhat as the tilt angle increases, the elastic restoring force increases more rapidly as a function of the tilt angle than the electrostatic force. The mirror plate 110 eventually stops at the tilt angle $\theta_{on1}$ (or $\theta_{on2}$) when the elastic restoring force becomes equal to the electrostatic force. In other words, the mirror plate 110 is held at the tilt angle $\theta_{on}$ by a balance between the electrostatic force and the elastic restoring force that apply forces on the mirror plate 110 in opposite directions. The mirror plate 110 may initially oscillate around the average tilt angle $\theta_{on1}$ (or $\theta_{on2}$) in a region 711 and subsequently settle to stay at the tilt angle $\theta_{on1}$ (or $\theta_{on2}$).

Similarly, a negative driving voltage pulse 702 can be applied to control the mirror plate 110 to the "off" position, as shown in FIG. 4C. Alternatively, voltage pulses of the same polarity are applied to opposite electrodes on the substrate (FIG. 3) to drive the mirror plate 110 to the "off" and the first "on" positions. For example, a first voltage pulse is applied to the two-part electrode 130a, 131a to tilt the mirror plate to the first "on" direction. A "second" voltage pulse of the same polarity is applied to the two-part electrode 130b, 131b to tilt the mirror plate to the "off" direction. The voltage pulse 702 includes a driving voltage $V_{off}$. The voltage pulse 702 can create an electrostatic force to tilt the mirror plate 110 in the "off" direction, which is a clockwise direction in the figures, to a tilt angle $\theta_{off}$ relative to the upper surface of the substrate 300. The mirror plate does not experience any elastic restoring force at the un-tilted position. As the tilt angle increases, the elastic restoring force, which applies a force that is in a counter clockwise direction, is created by the torsional distortions of the elongated hinges 163a or 163b. The elastic restoring force increases more rapidly as a function of the tilt angle than the electrostatic force. The mirror plate 110 eventually stops at the tilt angle $\theta_{off}$ when the elastic restoring force becomes equal to the electrostatic force. The mirror plate 110 is held at the tilt angle $\theta_{OFF}$ by a balance between the electrostatic force created by the negative voltage pulse 702 and the elastic restoring force by the distorted elongated hinges 163a and 163b. The mirror plate 110 may initially oscillate around the average tilt angle $\theta_{off}$ in a region 721 and then settle to stay at the tilt angle $\theta_{off}$. In the configurations shown in FIGS. 4A-4C, the tilt angles $\theta_{on1}$ and $\theta_{off}$ have equal magnitude. After the negative driving voltage pulse 702 is removed, the mirror plate 110 can be elastically pulled back to zero tilt angle (i.e., the horizontal or un-tilted orientation) by the elongated hinges 163a and 163b.

Figure 8:
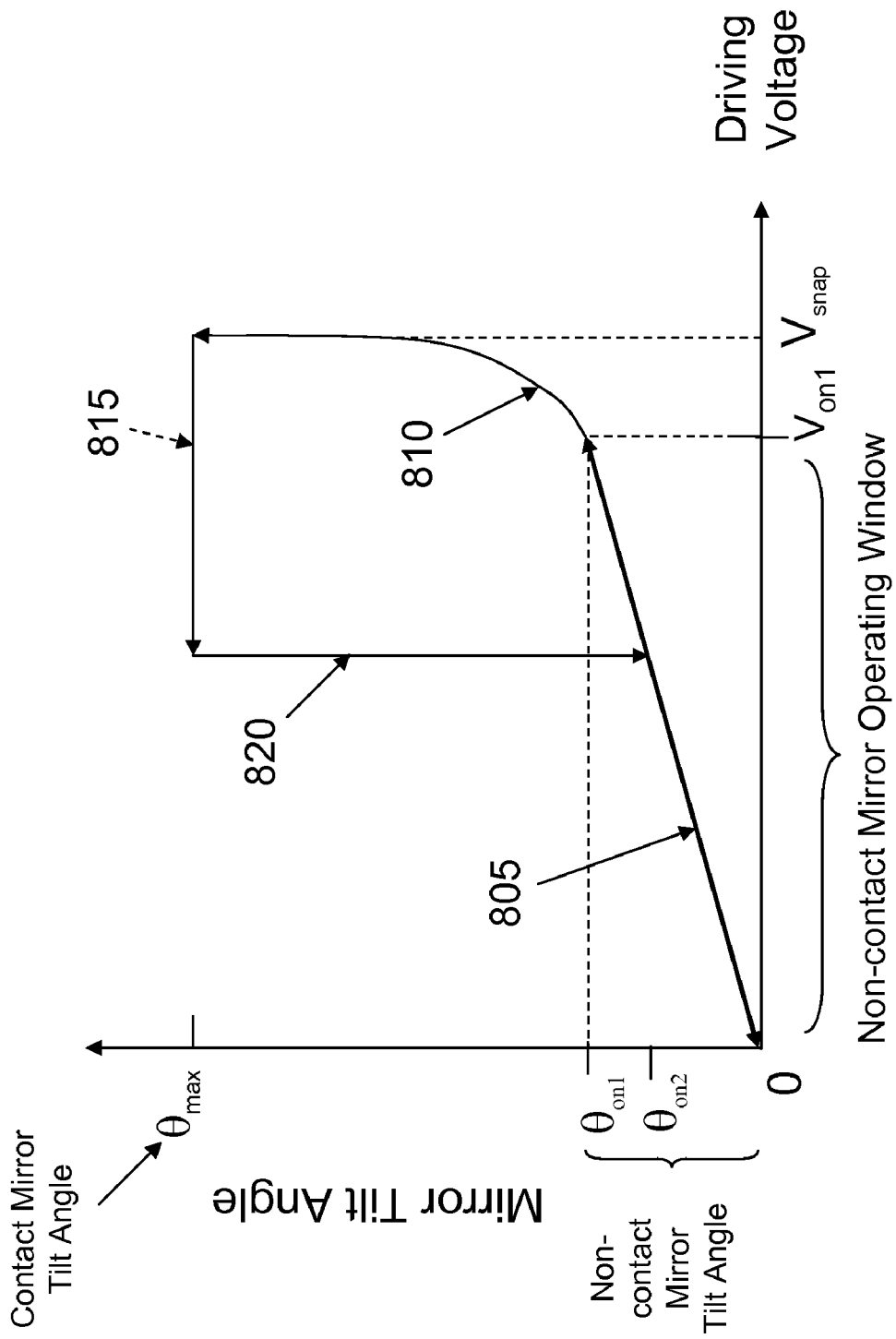
FIG. 8 is a graph illustrating a response curve of the tilt angle of a mirror plate as a function of the driving voltage for contact and non-contact micro mirrors.

A response curve of the tilt angle of a mirror plate as a function of a driving voltage is shown in FIG. 8. The tilt angle of the mirror plate first gradually increases as a function of the driving voltage along a curve 805. The tilt angle then rapidly increases along a curve 810 as the driving voltage increases until the mirror plate "snaps" at a snapping voltage $V_{snap}$ at which the elastic restoring force stops increasing as the tilt angle increases. The electrostatic force continues to increase as the tilt angle increases. The imbalance between the stronger electrostatic force and the constant plastic restoring force sharply increases the tilt angle to $\theta_{max}$ at which the tilt movement of the mirror plate is stopped by a mechanical stop on the substrate. In the present specification, the term "snap" refers to the unstable state of an imbalanced mirror plate where the mirror plate rapidly tilts until it is stopped by a fixed object, such as the substrate surface or electrode under the mirror.

After the micro mirror snaps at the tilt angle $\theta_{max}$, the mirror plate initially stays in contact with the mechanical stop within the drive voltage range indicated by line 815 as the driving voltage decreases. After the hinge returns to an elastic region, restores its elasticity, and can overcome stiction at the mechanical stop, the mirror plate finally tilts back along the response curve 805, where the drive voltage intersects with the line 820. The hysteresis represented by the curves 805, 810 and lines 815, 820 is a common property of the contact micro mirrors. The operational window for a non-contact micro mirror is along the curve 805 in the elastic region of the mirror plate. The mirror plate can be tilted and held at a tilt angle $\theta_{on1}$ (or $\theta_{off}$) by a driving voltage $V_{on1}$ or at a smaller tilt angle $\theta_{on2}$. The mirror plate can be elastically restored back to the original position by the hinges 163a and 163b along the same the response curve 805 after the electrostatic force is removed. There is no substantial hysteresis associated with the non-contact micro mirror 100 disclosed in the present specification.

Details about the construction and material selection of the non-contact micro mirrors are described further in U.S. application Ser. No. 11/553,886, "Non-contact micro-mirror array for projection display", filed Oct. 27, 2006, which are incorporated by reference herein for all purposes.

The disclosed display system may include one or more of the following advantages. The present specification discloses a micro-mirror based display device that is capable of producing grayscale display images, thus providing higher image quality than micro-mirror display devices that only produce a single brightness level. A tiltable mirror plate can be tilted to and held at predetermined angles in response to electric signals provided by a controller. No mechanical stop is required on the substrate or on the mirror plate to stop the tilted mirror plate and define the tilt angles of the mirror plate. Eliminating mechanical stops can simplify a micro mirror device, when compared to some micro mirror devices with mechanical stops. The lack of mechanical contact between the mirror plate and a structure, e.g., a mechanical stop, on the substrate, may also remove the problem of stiction that is known to exist between a mirror plate and mechanical stops in some mirror devices. Mirror plates described herein may tilt to a narrower angle than mirror plates in conventional devices. Less mirror plate tilting can cause less strain on the hinge around which the mirror plate rotates. Such devices may be less likely to experience mechanical breakdown. Thus, the useful lifetime of the device may be longer. Moreover, because the mirror plate undergoes a smaller angular deflection, it can operate at higher frequencies. Further, less tilting of the mirror plate allows the disclosed display device to use less power than the some other mirror based devices.

It is understood that the disclosed system and methods are compatible with other configurations and arrangements from the ones described above. The first "on" position, the second "on" position, and the "off" position can be arranged in different tilt angles as described above. The "off" position may not have a same tilt angle as one of the "on" positions. The direction of the reflected beam corresponding to the maximum brightness level at the image pixel may not be perpendicular to the substrate. The projection system can include one or more lenses and other optical components. Furthermore, the electrodes can include several steps as shown in the figures, or a single layer of conductive material. The mirror plate can have different shapes such as, rectangular, hexagonal, diamond, or octagonal. The driving voltage pulses can include different waveforms and polarities. The display system can include different configurations and designs for the optical paths without deviating from the spirit of the present invention. In any instance in which a numerical range is indicated herein, the numerical endpoints can refer to the number indicated or about the number indicated. It is understood that the disclosed display system can include an aperture structure that includes an aperture opening corresponding to each mirror plate in a micro mirror array. The aperture opening is configured to allow different amounts of reflected light beam from the mirror plate to a pixel location on a display surface.

What is claimed is:

1. A micro mirror device, comprising:
   a hinge supported by a substrate;
   a mirror plate tiltable around the hinge and having a reflective surface configured to reflect incident light to form a reflected light beam, wherein the hinge is configured to produce an elastic restoring force on the mirror plate when the mirror plate is tilted away from an un-tilted position;
   a controller configured to produce an electrostatic force to overcome the elastic restoring force to tilt the mirror plate from an un-tilted position to an "off" position, a first "on" position, or a second "on" position;
   an opaque aperture structure configured to block substantially all of a reflected light beam from reaching the display surface when the mirror plate is tilted to the "off" position, wherein the opaque aperture structure has an opening configured to allow a first portion of a reflected light beam to pass through when the mirror plate is tilted to the first "on" position and to allow a second portion of a reflected light beam to pass through when the mirror plate is tilted to the second "on" position, and the first portion is a greater portion than the second portion; and
   an optical projection system configured to direct the first portion of the reflected light beam to produce at a first level of brightness at a pixel on the display surface and to direct the second portion of the reflected light beam to produce a second level of brightness at the pixel on the display surface, wherein the pixel forms a portion of a display image on the display surface and the first level of brightness is greater than the second level of brightness.

2. The micro mirror device of claim 1, wherein:
   the controller is configured to produce an electrostatic force to tilt the mirror plate from the un-tilted position to a third "on" position; and
   the opening in the aperture structure is configured to allow a third portion of a reflected light beam to pass through to produce at a third level of brightness at the pixel on the display surface when the mirror plate is tilted to the third "on" position, wherein the third level of brightness is lower than the second level of brightness.

3. The micro mirror device of claim 1, wherein the electrostatic force is configured to counter the elastic restoring force to hold the mirror plate at the first "on" position, the second "on" position, or the "off" position.

4. The micro mirror device of claim 3, wherein the hinge is configured to elastically restore the mirror plate from the first "on" position, the second "on" position, or the "off" position to the un-tilted position after the electrostatic force is reduced or removed.

5. The micro mirror device of claim 1, further comprising an electrode on the substrate, wherein the controller is configured to apply a voltage to the electrode to produce the electrostatic force.

6. The micro mirror device of claim 1, wherein at least one of the first "on" position, the second "on" position, or the "off" position has a tilt angle 1 degree or greater relative to the un-tilted position.

7. The micro mirror device of claim 1, wherein the first "on" position, the second "on" position, and the "off" position have tilt angles 10 degrees or smaller relative to the un-tilted position.

8. The micro mirror device of claim 7, wherein the first "on" position, the second "on" position, and the "off" position have tilt angles 6 degrees or smaller relative to the un-tilted position.

9. The micro mirror device of claim 1, wherein the mirror plate in the un-tilted position is substantially parallel to an upper surface of the substrate.

10. The micro mirror device of claim 1, wherein the un-tilted position is different from the first "on" position, the second "on" position, or the "off" position.

11. The micro mirror device of claim 1, wherein the un-tilted position is the same as one of the first "on" position, the second "on" position, or the "off" position.

12. The micro mirror device of claim 1, wherein the incident light has a substantially constant intensity.

13. A method for producing multiple levels of brightness at a pixel of a display image on a display surface, comprising:
   tilting a mirror plate supported by a substrate from an un-tilted position to an "off" position, a first "on" position, or a second "on" position, wherein the step of tilting comprises overcoming an elastic restoring force produced by a hinge on the mirror plate;
   reflecting incident light off of a reflective surface of the mirror plate to form a reflected light beam;
   passing a first portion of the reflected light beam through an opening of an opaque aperture structure when the mirror plate is tilted to the first "on" position;
   directing the first portion of the reflected light beam to produce at a first level of brightness at a pixel in the display image;
   passing a second portion of the reflected light beam through an opening of the aperture structure when the mirror plate is tilted to the second "on" position;
   directing the second portion of the reflected light beam to produce a second level of brightness at the pixel in the display image, wherein the first portion of the reflective light beam is greater than the second portion of the reflective light beam and wherein the first level of brightness is greater than the second level of brightness; and
   blocking substantially all of the reflected light beam from reaching the display surface with an opaque portion of the aperture structure when the mirror plate is tilted to the "off" position.

14. The method of claim 13, further comprising forming an image of the mirror plate at the pixel on the display surface using the first portion of the reflected beam or the second portion of the reflected beam.

15. The method of claim 13, wherein the elastic restoring force is produced by a distortion in the hinge caused by the tilt of the mirror plate.

16. The method of claim 15, further comprising holding the mirror plate at the first "on" position, the second "on" position, or the "off" position by an electrostatic force to balance the elastic restoring force.

17. The method of claim 16, further comprising:
   reducing or removing the electrostatic force; and
   elastically restoring the mirror plate to the un-tilted position after the electrostatic force is reduced or removed.

18. The method of claim 13, wherein the un-tilted position is substantially parallel to an upper surface of the substrate.

19. The method of claim 13, wherein the mirror plate has a tilt angle at or above 1 degree relative to the un-tilted position at one of the first "on" position, the second "on" position, or the "off" position.

20. The method of claim 13, wherein the first "on" position, the second "on" position, and the "off" position have tilt angles 10 degrees or less relative to the un-tilted position.

21. The method of claim 20, wherein the first "on" position, the second "on" position, and the "off" position have tilt angles 6 degrees or less relative to the un-tilted position.

* * * * *